US010240037B2

(12) United States Patent
Lee et al.

(10) Patent No.: US 10,240,037 B2
(45) Date of Patent: *Mar. 26, 2019

(54) POLYCARBONATE-BASED RESIN COMPOSITION AND MOLDED ARTICLE THEREOF

(71) Applicant: LG CHEM, LTD., Seoul (KR)

(72) Inventors: Jong Hyun Lee, Daejeon (KR); Su Kyoung Lee, Daejeon (KR); Min Ji Kim, Daejeon (KR); Ryul Lee, Daejeon (KR); Sung Tae Ahn, Daejeon (KR)

(73) Assignee: LG CHEM, LTD., Seoul (KR)

( * ) Notice: Subject to any disclaimer, the term of this patent is extended or adjusted under 35 U.S.C. 154(b) by 39 days.

This patent is subject to a terminal disclaimer.

(21) Appl. No.: 15/516,619

(22) PCT Filed: Dec. 3, 2015

(86) PCT No.: PCT/KR2015/013161
§ 371 (c)(1),
(2) Date: Apr. 3, 2017

(87) PCT Pub. No.: WO2016/089139
PCT Pub. Date: Jun. 9, 2016

(65) Prior Publication Data
US 2017/0298222 A1 Oct. 19, 2017

(30) Foreign Application Priority Data

Dec. 4, 2014 (KR) .................. 10-2014-0173005
Dec. 2, 2015 (KR) .................. 10-2015-0170809

(51) Int. Cl.
C08K 7/14 (2006.01)
C08L 69/00 (2006.01)
C08G 64/18 (2006.01)
C08G 64/38 (2006.01)
C08G 77/448 (2006.01)
C08J 5/00 (2006.01)
C08G 64/16 (2006.01)
C08G 64/06 (2006.01)
C08G 64/30 (2006.01)
C08G 64/08 (2006.01)
C08K 5/3475 (2006.01)
C08L 83/04 (2006.01)
C08G 64/24 (2006.01)
C08L 83/10 (2006.01)
C08K 5/00 (2006.01)
C08G 64/22 (2006.01)
C08G 77/14 (2006.01)
C08L 83/06 (2006.01)
C08J 5/08 (2006.01)
C08K 5/521 (2006.01)

(Continued)

(52) U.S. Cl.
CPC .............. *C08L 69/00* (2013.01); *C08G 64/06* (2013.01); *C08G 64/085* (2013.01); *C08G 64/1666* (2013.01); *C08G 64/1691* (2013.01); *C08G 64/18* (2013.01); *C08G 64/186* (2013.01); *C08G 64/22* (2013.01); *C08G 64/24* (2013.01); *C08G 64/307* (2013.01); *C08G 64/38* (2013.01); *C08G 77/14* (2013.01); *C08G 77/20* (2013.01); *C08G 77/448* (2013.01); *C08J 5/00* (2013.01); *C08J 5/08* (2013.01); *C08K 5/005* (2013.01); *C08K 5/3475* (2013.01); *C08K 5/42* (2013.01); *C08K 5/521* (2013.01); *C08L 51/04* (2013.01); *C08L 69/005* (2013.01); *C08L 83/04* (2013.01); *C08L 83/06* (2013.01); *C08L 83/10* (2013.01); *C09K 21/14* (2013.01); *C08K 3/40* (2013.01); *C08K 7/14* (2013.01); *C08K 2201/003* (2013.01); *C08K 2201/004* (2013.01); *C08K 2201/016* (2013.01); *C08L 2201/08* (2013.01); *C08L 2201/10* (2013.01); *C08L 2205/02* (2013.01); *C08L 2205/025* (2013.01); *C08L 2205/03* (2013.01); *C08L 2205/035* (2013.01); *C08L 2205/05* (2013.01); *C08L 2205/06* (2013.01); *C08L 2207/53* (2013.01)

(58) Field of Classification Search
None
See application file for complete search history.

(56) References Cited

U.S. PATENT DOCUMENTS 3,819,744 A 6/1974 Buechner et al.
5,137,949 A 8/1992 Paul et al.
(Continued)

FOREIGN PATENT DOCUMENTS

CN 101124282 A 2/2008
CN 101585961 A 11/2009
(Continued)

OTHER PUBLICATIONS

Hwang, et al.: "Production of impact strength and fluidity-improved polycarbonate and composition comprising same", Chemical Abstract for US2016/0251481A1, Mar. 24, 2016.
(Continued)

Primary Examiner — Richard A Huhn
(74) Attorney, Agent, or Firm — Dentons US LLP

(57) ABSTRACT

The present invention relates to a polycarbonate-based resin composition and a molded article thereof, and more particularly, to a polycarbonate-based resin composition exhibiting low deformation characteristic, excellent impact strength, excellent appearance surface characteristic, and excellent flame retardancy, and a molded article formed therefrom.

14 Claims, No Drawings

(51) Int. Cl.
  *C08L 51/04* (2006.01)
  *C08K 5/42* (2006.01)
  *C09K 21/14* (2006.01)
  *C08G 77/20* (2006.01)
  *C08K 3/40* (2006.01)

(56) References Cited

U.S. PATENT DOCUMENTS

| | | |
|---|---|---|
| 5,324,454 A | 6/1994 | Takata et al. |
| 5,380,795 A | 1/1995 | Gosens et al. |
| 5,455,310 A | 10/1995 | Hoover et al. |
| 5,502,134 A | 3/1996 | Okamoto et al. |
| 5,608,026 A | 3/1997 | Hoover et al. |
| 5,783,651 A | 7/1998 | König et al. |
| 5,932,677 A | 8/1999 | Hoover et al. |
| 6,001,929 A | 12/1999 | Nodera et al. |
| 6,252,013 B1 | 6/2001 | Banach et al. |
| 6,281,286 B1 | 8/2001 | Chorvath et al. |
| 6,780,956 B2 | 8/2004 | Davis |
| 7,135,538 B2 | 11/2006 | Glasgow et al. |
| 7,332,559 B2 | 2/2008 | Hong et al. |
| 7,432,327 B2 | 10/2008 | Glasgow |
| 7,498,401 B2 | 3/2009 | Agarwal |
| 7,524,919 B2 | 4/2009 | Hoover et al. |
| 7,691,304 B2 | 4/2010 | Agarwal et al. |
| 7,709,581 B2 | 5/2010 | Glasgow et al. |
| 7,718,733 B2 | 5/2010 | Juikar et al. |
| 8,030,379 B2 | 10/2011 | Nodera et al. |
| 8,084,134 B2 | 12/2011 | Malinoski et al. |
| 8,124,683 B2 | 2/2012 | Jung et al. |
| 8,389,648 B2 | 3/2013 | Adoni et al. |
| 8,466,249 B2 | 6/2013 | Gallucci et al. |
| 8,552,096 B2 | 10/2013 | Li et al. |
| 8,912,290 B2 | 12/2014 | Huggins et al. |
| 8,933,186 B2 | 1/2015 | Bahn et al. |
| 8,962,780 B2 | 2/2015 | Higaki et al. |
| 8,981,017 B2 | 3/2015 | Ishikawa |
| 9,062,164 B2 | 6/2015 | Kim et al. |
| 9,080,021 B2 | 7/2015 | Ishikawa et al. |
| 9,102,832 B2 | 8/2015 | Sybert et al. |
| 9,255,179 B2 | 2/2016 | Park et al. |
| 9,505,929 B2 | 11/2016 | Natarajan et al. |
| 9,580,597 B2 | 2/2017 | Jeong et al. |
| 9,745,466 B2 | 8/2017 | Park et al. |
| 9,840,585 B2 | 12/2017 | Park et al. |
| 2003/0027905 A1 | 2/2003 | Mahood et al. |
| 2003/0065122 A1 | 4/2003 | Davis |
| 2004/0200303 A1 | 10/2004 | Inoue et al. |
| 2006/0148986 A1 | 7/2006 | Glasgow et al. |
| 2007/0093629 A1 | 4/2007 | Silva et al. |
| 2007/0135569 A1 | 6/2007 | Derudder |
| 2007/0241312 A1 | 10/2007 | Hikosaka |
| 2007/0258412 A1 | 11/2007 | Schilling et al. |
| 2008/0015289 A1 | 1/2008 | Siripurapu |
| 2008/0081895 A1 | 4/2008 | Lens et al. |
| 2008/0230751 A1 | 9/2008 | Li et al. |
| 2009/0087761 A1 | 4/2009 | Fukushima et al. |
| 2009/0326183 A1 | 12/2009 | Schultz et al. |
| 2010/0233603 A1 | 9/2010 | Hikosaka |
| 2012/0123034 A1 | 5/2012 | Morizur et al. |
| 2012/0251750 A1 | 10/2012 | Sybert et al. |
| 2012/0252985 A1 | 10/2012 | Rosenquist et al. |
| 2012/0271009 A1 | 10/2012 | Higaki et al. |
| 2012/0283393 A1 | 11/2012 | Ishikawa |
| 2013/0035441 A1 | 2/2013 | De Brouwer et al. |
| 2013/0082222 A1 | 4/2013 | Aoki |
| 2013/0186799 A1 | 7/2013 | Stam et al. |
| 2013/0190425 A1 | 7/2013 | Zhu et al. |
| 2013/0267665 A1 | 10/2013 | Huggins et al. |
| 2013/0274392 A1 | 10/2013 | Morizur et al. |
| 2013/0289224 A1 | 10/2013 | Bae et al. |
| 2013/0309474 A1 | 11/2013 | Peek et al. |
| 2013/0313493 A1 | 11/2013 | Wen et al. |
| 2013/0317142 A1 | 11/2013 | Chen et al. |
| 2013/0317146 A1 | 11/2013 | Li et al. |
| 2013/0317150 A1 | 11/2013 | Wan et al. |
| 2013/0331492 A1 | 12/2013 | Sharma |
| 2014/0058024 A1* | 2/2014 | Son ................... C08K 5/521 524/127 |
| 2014/0106208 A1 | 4/2014 | Ishikawa et al. |
| 2014/0148559 A1 | 5/2014 | Kim et al. |
| 2014/0179843 A1 | 6/2014 | Van Der Mee et al. |
| 2014/0206802 A1 | 7/2014 | Bahn et al. |
| 2014/0323623 A1 | 10/2014 | Miyake et al. |
| 2015/0057423 A1 | 2/2015 | Kim et al. |
| 2015/0175802 A1 | 6/2015 | Sybert et al. |
| 2015/0197633 A1 | 7/2015 | Van Der Mee et al. |
| 2015/0210854 A1 | 7/2015 | Aoki |
| 2015/0218371 A1 | 8/2015 | Lee et al. |
| 2015/0307706 A1 | 10/2015 | Rosenquist et al. |
| 2015/0315380 A1* | 11/2015 | Bahn ................... C08L 83/04 524/352 |
| 2015/0344623 A1* | 12/2015 | Park ................... C08G 64/1666 528/29 |
| 2015/0368484 A1 | 12/2015 | Shishaku et al. |
| 2016/0002410 A1 | 1/2016 | Iyer et al. |
| 2016/0017102 A1 | 1/2016 | Yamada |
| 2016/0122477 A1 | 5/2016 | Rhee et al. |
| 2016/0251481 A1 | 9/2016 | Hwang et al. |
| 2016/0297926 A1 | 10/2016 | Hwang et al. |
| 2016/0319127 A1 | 11/2016 | Jeong et al. |
| 2016/0326312 A1 | 11/2016 | Park et al. |
| 2016/0326313 A1 | 11/2016 | Son et al. |
| 2016/0326314 A1 | 11/2016 | Son et al. |
| 2016/0326321 A1 | 11/2016 | Park et al. |
| 2016/0369047 A1 | 12/2016 | Hwang et al. |
| 2016/0369048 A1 | 12/2016 | Park et al. |
| 2016/0369095 A1 | 12/2016 | Park et al. |
| 2016/0376405 A1 | 12/2016 | Park et al. |
| 2017/0137568 A1 | 5/2017 | Chun et al. |
| 2017/0306146 A1* | 10/2017 | Lee ................... C08G 64/24 |
| 2017/0321014 A1* | 11/2017 | Lee ................... C08G 64/24 |

FOREIGN PATENT DOCUMENTS

| | | |
|---|---|---|
| CN | 102471474 A | 5/2012 |
| CN | 102933657 A | 2/2013 |
| CN | 103443201 A | 12/2013 |
| CN | 103827217 A | 5/2014 |
| CN | 103958573 A | 7/2014 |
| CN | 104066773 A | 9/2014 |
| CN | 104321382 A | 1/2015 |
| CN | 104837895 A | 8/2015 |
| CN | 105899576 A | 8/2016 |
| EP | 0284865 A2 | 3/1988 |
| EP | 0685507 B1 | 10/1998 |
| EP | 0524731 B1 | 3/2002 |
| JP | 05-186675 A | 7/1993 |
| JP | 05-311079 A | 11/1993 |
| JP | 07-053702 A | 2/1995 |
| JP | 07-216080 A | 8/1995 |
| JP | 07-258532 A | 10/1995 |
| JP | 08-234468 A | 9/1996 |
| JP | 10-204179 A | 8/1998 |
| JP | 2000-280414 A | 10/2000 |
| JP | 2000-302962 A | 10/2000 |
| JP | 2002-220526 A | 8/2002 |
| JP | 3393616 B2 | 4/2003 |
| JP | 3457805 B2 | 10/2003 |
| JP | 2004-035587 A | 2/2004 |
| JP | 2004-536193 A | 12/2004 |
| JP | 2008-248262 A | 10/2008 |
| JP | 2011-236287 A | 11/2011 |
| JP | 2012-116915 A | 6/2012 |
| JP | 2012-153824 A | 8/2012 |
| JP | 2012-246430 A | 12/2012 |
| JP | 5290483 B2 | 9/2013 |
| JP | 5315246 B2 | 10/2013 |
| JP | 2013-234298 A | 11/2013 |
| JP | 2013-238667 A | 11/2013 |
| JP | 2014-080462 A | 5/2014 |
| JP | 2014-080496 A | 5/2014 |
| JP | 5547953 B2 | 7/2014 |

(56) References Cited

FOREIGN PATENT DOCUMENTS

| | | |
|---|---|---|
| JP | 2015-163722 A | 9/2015 |
| JP | 6049113 B2 | 12/2016 |
| KR | 2002-0031176 A | 4/2002 |
| KR | 10-0366266 B1 | 4/2003 |
| KR | 10-0676301 B1 | 1/2007 |
| KR | 10-0699560 B1 | 3/2007 |
| KR | 2007-0098827 A | 10/2007 |
| KR | 2007-0116789 A | 12/2007 |
| KR | 10-0850125 B1 | 8/2008 |
| KR | 10-2008-0083278 A | 9/2008 |
| KR | 10-2009-0033093 A | 4/2009 |
| KR | 10-1007451 B1 | 1/2011 |
| KR | 2011-0068682 A | 6/2011 |
| KR | 2011-0095869 A | 8/2011 |
| KR | 2011-0108610 A | 10/2011 |
| KR | 10-1081503 B1 | 11/2011 |
| KR | 10-1116440 B1 | 3/2012 |
| KR | 2012-0050968 A | 5/2012 |
| KR | 2012-0089436 A | 8/2012 |
| KR | 2012-0098769 A | 9/2012 |
| KR | 10-1245408 B1 | 3/2013 |
| KR | 10-1256261 B1 | 4/2013 |
| KR | 2013-0047332 A | 5/2013 |
| KR | 2013-0047612 A | 5/2013 |
| KR | 2013-0074748 A | 7/2013 |
| KR | 2013-0077772 A | 7/2013 |
| KR | 2013-0079621 A | 7/2013 |
| KR | 2013-0090358 A | 8/2013 |
| KR | 2013-0090359 A | 8/2013 |
| KR | 2013-0104317 A | 9/2013 |
| KR | 2013-0111213 A | 10/2013 |
| KR | 2013-0121121 A | 11/2013 |
| KR | 2013-0129791 A | 11/2013 |
| KR | 10-1341719 B1 | 12/2013 |
| KR | 10-1362875 B1 | 2/2014 |
| KR | 2014-0026445 A | 3/2014 |
| KR | 2014-0027199 A | 3/2014 |
| KR | 2014-0035404 A | 3/2014 |
| KR | 10-1396034 B1 | 5/2014 |
| KR | 2014-0052833 A | 5/2014 |
| KR | 2014-0054201 A | 5/2014 |
| KR | 2014-0065513 A | 5/2014 |
| KR | 10-1407514 B1 | 6/2014 |
| KR | 2014-0075516 A | 6/2014 |
| KR | 2014-0075517 A | 6/2014 |
| KR | 2014-0077164 A | 6/2014 |
| KR | 10-1418503 B1 | 7/2014 |
| KR | 2014-0084858 A | 7/2014 |
| KR | 2014-0086774 A | 7/2014 |
| KR | 10-1440536 B1 | 9/2014 |
| KR | 2014-0116921 A | 10/2014 |
| KR | 2014-0117396 A | 10/2014 |
| KR | 2014-0118274 A | 10/2014 |
| KR | 2014-0119018 A | 10/2014 |
| KR | 10-1459132 B1 | 11/2014 |
| KR | 2014-0003678 A | 1/2015 |
| KR | 2014-0010725 A | 1/2015 |
| KR | 2015-0032173 A | 3/2015 |
| KR | 10-1522321 B1 | 5/2015 |
| KR | 2015-0057275 A | 5/2015 |
| KR | 101563269 B1 | 10/2015 |
| KR | 1020150119823 A | 10/2015 |
| KR | 2015-0134457 A | 12/2015 |
| KR | 10-1664844 B1 | 10/2016 |
| TW | 201241043 A | 10/2012 |
| WO | 2012/060516 A1 | 5/2012 |
| WO | 2013/051557 A1 | 4/2013 |
| WO | 2013/058214 A1 | 4/2013 |
| WO | 2013-073709 A1 | 5/2013 |
| WO | 2013-100606 A1 | 7/2013 |
| WO | 2013-115538 A1 | 8/2013 |
| WO | 2013/115604 A1 | 8/2013 |
| WO | WO-2013115538 A1 * | 8/2013 ............. C08L 69/00 |
| WO | 2013/175445 A2 | 11/2013 |
| WO | 2013175455 A1 | 11/2013 |
| WO | 2014/042252 A1 | 3/2014 |
| WO | 2014/058033 A1 | 4/2014 |
| WO | 2014/119827 A1 | 8/2014 |
| WO | 2014-139110 A1 | 9/2014 |
| WO | 2014/144673 A1 | 9/2014 |
| WO | 2014/179206 A2 | 11/2014 |
| WO | 2015/011669 A2 | 1/2015 |
| WO | 2015/015445 A2 | 2/2015 |
| WO | 2015/041441 A1 | 3/2015 |
| WO | 2015/087595 A1 | 6/2015 |

OTHER PUBLICATIONS

Chemical Abstract registry No. 163617-00-3, Jun. 8, 1995.

* cited by examiner

POLYCARBONATE-BASED RESIN COMPOSITION AND MOLDED ARTICLE THEREOF

CROSS-REFERENCE TO RELATED APPLICATION

This application is a National Stage Application of International Application No. PCT/KR2015/013161 filed on Dec. 3, 2015, which claims the benefit of Korean Patent Application No. 10-2014-0173005 filed on Dec. 4, 2014 and Korean Patent Application No. 10-2015-0170809 filed on Dec. 2, 2015, all of which are hereby incorporated by reference in their entirety for all purposes as if fully set forth herein.

TECHNICAL FIELD

The present invention relates to a polycarbonate-based resin composition and a molded article thereof, and more particularly, to a polycarbonate-based resin composition exhibiting low deformation characteristic, excellent impact strength, excellent appearance surface characteristic, and excellent flame retardancy, and a molded article formed therefrom.

BACKGROUND

A polycarbonate resin is a thermoplastic resin formed by condensation-polymerization of an aromatic diol such as bisphenol A with a carbonate precursor such as a phosgene, and has excellent impact strength, dimensional stability, heat resistance, and transparency, etc. Thus, the polycarbonate resin has application in a wide range of uses, such as exterior materials of electrical and electronic products, automobile components, building materials, and optical components, etc.

In recent years, application of polycarbonate-based materials for housing of portable electronic devices such as a tablet PC, etc., has been reviewed. However, when such a polycarbonate-based material is used, there is a disadvantage that a relatively large warpage phenomenon appears. In order to solve the problem, a method of reinforcing a polycarbonate-based material with a glass fiber that is surface-coated with a silane-based compound, etc., has been widely applied from the past.

However, a material reinforced with the glass fiber has disadvantages in that as a content of the glass fiber is increased, the impact strength of the polycarbonate-based material is largely deteriorated, and an appearance surface characteristic is deteriorated due to protrusion of the glass fiber, etc.

Further, when a separate impact-reinforcing agent is used to solve the deterioration of the impact strength due to the glass fiber reinforcement, there is a disadvantage that it is difficult to impart flame retardancy required for the material for housing of electronic devices.

Due to these problems of the related art, there is a continuing need for development of polycarbonate-based materials that are capable of exhibiting low deformation characteristic, excellent impact strength, and appearance surface characteristic, together with excellent flame retardancy, while relatively reducing the content of the glass fiber, thereby being suitably usable as the material for housing of portable electronic devices such as a tablet PC, etc.

SUMMARY OF THE INVENTION

The present invention has been made in an effort to provide a polycarbonate-based resin composition having advantages of exhibiting low deformation characteristic, excellent impact strength, excellent appearance surface characteristic, and excellent flame retardancy.

In addition, the present invention has been made in an effort to provide a molded article including the polycarbonate-based resin composition as described above.

An exemplary embodiment of the present invention provides a polycarbonate-based resin composition including: a polycarbonate resin including an aromatic polycarbonate-based first repeating unit, a copolycarbonate resin including an aromatic polycarbonate-based first repeating unit, and an aromatic polycarbonate-based second repeating unit having one or more siloxane bonds, a glass fiber, an impact-reinforcing agent including a rubber-modified vinyl-based graft copolymer, and a phosphorus-based flame retardant;

wherein the first repeating unit each independently includes a repeating unit represented by Chemical Formula 1 below, and;

the second repeating unit includes at least one repeating unit selected from the group consisting of Chemical Formula 3 below:

[Chemical Formula 1]

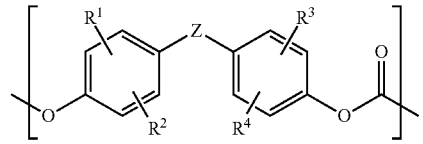

in Chemical Formula 1, $R^1$ to $R^4$ are each independently hydrogen, $C_{1-10}$ alkyl, $C_{1-10}$ alkoxy, or halogen, and Z is $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO;

[Chemical Formula 3]

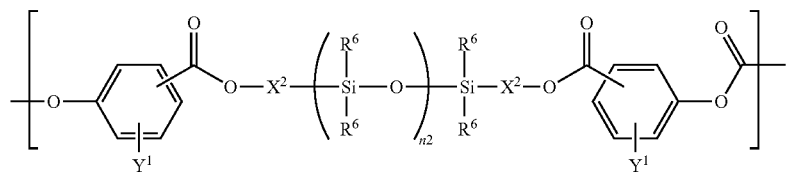

in Chemical Formula 3, $X^2$ is each independently $C_{1-10}$ alkylene, $Y^1$ is each independently hydrogen, $C_{1-6}$ alkyl, halogen, hydroxy, $C_{1-6}$ alkoxy or $C_{6-20}$ aryl, $R^6$ is each independently hydrogen; $C_{1-15}$ alkyl unsubstituted or substituted with oxiranyl, oxiranyl-substituted $C_{1-10}$ alkoxy, or $C_{6-20}$ aryl; halogen; $C_{1-10}$ alkoxy; allyl; $C_{1-10}$ haloalkyl; or $C_{6-20}$ aryl, and n2 is an integer of 10 to 200.

Another embodiment of the present invention provides a molded article including the polycarbonate-based resin composition as described above.

Hereinafter, the polycarbonate-based resin composition and the molded article thereof according to specific exemplary embodiments of the present invention are described in more detail.

The technical terms used in the present specification intend to describe specific exemplary embodiments, but should not be interpreted as limiting the present invention. In addition, singular forms used herein include a plurality of forms unless the phrases have clearly opposite meanings.

In addition, term 'including' or 'containing' used in the present specification specifies specific characteristics, regions, integers, steps, operations, elements, or components, but it does not exclude the addition of other specific characteristics, regions, integers, steps, operations, elements, or components.

In addition, terms including ordinal numbers such as 'first', 'second', etc., in the present specification are used to distinguish one constituent element other constituent elements, and are not limited by the ordinal numbers. For example, the first constituent elements may be referred to as the second constituent elements within the scope range of the present invention, and similar to this, the second constituent elements may also be referred to as the first constituent elements.

I. Polycarbonate-Based Resin Composition

According to an exemplary embodiment of the present invention, there is provided a polycarbonate-based resin composition including: a polycarbonate resin including an aromatic polycarbonate-based first repeating unit, a copolycarbonate resin including an aromatic polycarbonate-based first repeating unit, and an aromatic polycarbonate-based second repeating unit having one or more siloxane bonds, a glass fiber, an impact-reinforcing agent including a rubber-modified vinyl-based graft copolymer, and a phosphorus-based flame retardant;

wherein the first repeating unit each independently includes a repeating unit represented by Chemical Formula 1 below, and;

the second repeating unit includes at least one repeating unit selected from the group consisting of Chemical Formula 3 below:

[Chemical Formula 1]

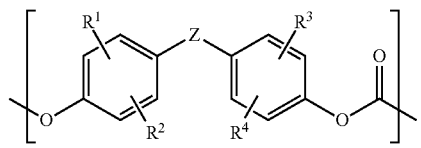

in Chemical Formula 1, $R^1$ to $R^4$ are each independently hydrogen, $C_{1-10}$ alkyl, $C_{1-10}$ alkoxy, or halogen, and Z is $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO;

[Chemical Formula 3]

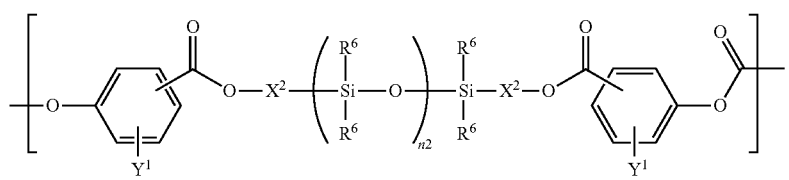

in Chemical Formula 3, $X^2$ is each independently $C_{1-10}$ alkylene, $Y^1$ is each independently hydrogen, $C_{1-6}$ alkyl, halogen, hydroxy, $C_{1-6}$ alkoxy or $C_{6-20}$ aryl, $R^6$ is each independently hydrogen; $C_{1-15}$ alkyl unsubstituted or substituted with oxiranyl, oxiranyl-substituted $C_{1-10}$ alkoxy, or $C_{6-20}$ aryl; halogen; $C_{1-10}$ alkoxy; allyl; $C_{1-10}$ haloalkyl; or $C_{6-20}$ aryl, and n2 is an integer of 10 to 200. In addition, in the composition of an exemplary embodiment, the second repeating unit of the copolycarbonate resin may further include at least one repeating unit selected from the group consisting of Chemical Formula 2 below:

[Chemical Formula 2]

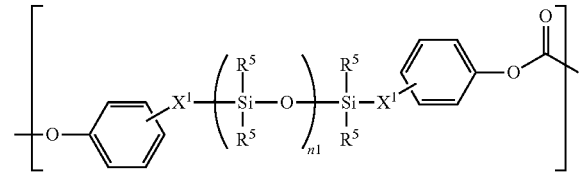

in Chemical Formula 2, $X^1$ is each independently $C_{1-10}$ alkylene, $R^5$ is each independently hydrogen; $C_{1-15}$ alkyl unsubstituted or substituted with oxiranyl, oxiranyl-substituted $C_{1-10}$ alkoxy, or $C_{6-20}$ aryl; halogen; $C_{1-10}$ alkoxy; allyl; $C_{1-10}$ haloalkyl; or $C_{6-20}$ aryl, and n1 is an integer of 10 to 200.

As a result of continuous research, the present inventors found that when the resin composition according to an exemplary embodiment of the present invention includes a copolycarbonate resin in which a specific siloxane bond represented by Chemical Formula 3, more suitably, siloxane bonds represented by Chemical Formulas 2 and 3 are introduced into a polycarbonate main chain, physical properties of a general aromatic polycarbonate resin could be complemented, and thus, the resin composition could exhibit more excellent impact strength (impact resistance) or other mechanical properties, etc.

Accordingly, it was confirmed that when the specific copolycarbonate resin was used together with the general aromatic polycarbonate resin, it was possible to provide a resin composition exhibiting low deformation characteristic, an excellent impact strength, etc., even if a relatively low content of glass fiber and a relatively low content of impact-reinforcing agent are used. As a result, protrusion of the glass fiber, etc., may be reduced due to the use of the low content of glass fiber, and thus, appearance surface characteristic may be improved. In addition, a low content of the impact-reinforcing agent and an appropriate content of the flame retardant may be used, and thus, the resin composition of an exemplary embodiment may exhibit excellent flame retardancy.

Accordingly, the resin composition of an exemplary embodiment may exhibit low deformation characteristic, excellent impact strength, and appearance surface characteristic, together with excellent flame retardancy, which is suitably usable as a material for housing of portable electronic devices such as a tablet PC, etc.

Hereinafter, components that may be included in the polycarbonate-based resin composition according to an exemplary embodiment of the present invention are described in more detail.

(1) Polycarbonate Resin

The polycarbonate resin is a base resin included in the polycarbonate-based resin composition, and includes an aromatic polycarbonate-based first repeating unit.

The polycarbonate resin includes the aromatic polycarbonate-based first repeating unit, which may be distinguished from the copolycarbonate resin to be described below in that the polycarbonate resin does not have an aromatic polycarbonate-based repeating unit having a siloxane bond (for example, the second repeating unit).

Specifically, the aromatic polycarbonate-based first repeating unit is formed by a reaction of a diol compound and a carbonate precursor, and suitably, may include a repeating unit represented by Chemical Formula 1 below, and a structure of the repeating unit may be the same or different from the first repeating unit included in the copolycarbonate resin described below:

[Chemical Formula 1]

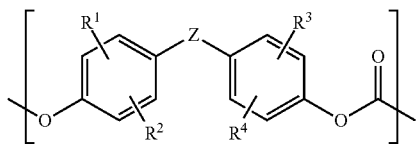

in Chemical Formula 1, $R^1$ to $R^4$ are each independently hydrogen, $C_{1-10}$ alkyl, $C_{1-10}$ alkoxy, or halogen, and Z is $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO.

Preferably, $R^1$ to $R^4$ are each independently hydrogen, methyl, chloro, or bromo.

In addition, preferably, Z is a linear or branched $C_{1-10}$ alkylene unsubstituted or substituted with phenyl, and more preferably, methylene, ethane-1,1-diyl, propane-2,2-diyl, butane-2,2-diyl, 1-phenylethane-1,1-diyl, or diphenylmethylene. In addition, preferably, Z is cyclohexane-1,1-diyl, O, S, SO, $SO_2$, or CO.

As non-limiting examples, the repeating unit represented by Chemical Formula 1 may be derived from one or more aromatic diol compounds selected from the group consisting of bis(4-hydroxyphenyl)methane, bis(4-hydroxyphenyl)ether, bis(4-hydroxyphenyl)sulfone, bis(4-hydroxyphenyl)sulfoxide, bis(4-hydroxyphenyl)sulfide, bis(4-hydroxyphenyl)ketone, 1,1-bis(4-hydroxyphenyl)ethane, bisphenol A, 2,2-bis(4-hydroxyphenyl)butane, 1,1-bis(4-hydroxyphenyl)cyclohexane, 2,2-bis(4-hydroxy-3,5-dibromophenyl)propane, 2,2-bis(4-hydroxy-3,5-dichlorophenyl)propane, 2,2-bis(4-hydroxy-3-bromophenyl)propane, 2,2-bis(4-hydroxy-3-chlorophenyl)propane, 2,2-bis(4-hydroxy-3-methylphenyl)propane, 2,2-bis(4-hydroxy-3,5-dimethylphenyl)propane, 1,1-bis(4-hydroxyphenyl)-1-phenylethane, bis(4-hydroxyphenyl)diphenylmethane, and α,ω-bis[3-(o-hydroxyphenyl)propyl]polydimethylsiloxane.

The description 'derived from the aromatic diol compound' means that a hydroxy group of the aromatic diol compound and the carbonate precursor are reacted to form the repeating unit represented by Chemical Formula 1.

As non-limiting example, when bisphenol A, i.e., the aromatic diol compound, and triphosgene, i.e., the carbonate precursor, are polymerized, the repeating unit represented by Chemical Formula 1 may be represented by Chemical Formula 1-1 below:

[Chemical Formula 1-1]

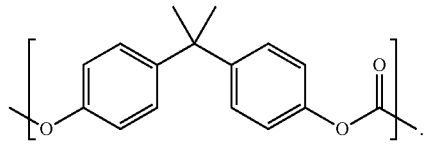

As the carbonate precursor, at least one selected from the group consisting of dimethyl carbonate, diethyl carbonate, dibutyl carbonate, dicyclohexyl carbonate, diphenyl carbonate, ditolyl carbonate, bis(chlorophenyl)carbonate, di-m-cresyl carbonate, dinaphthyl carbonate, bis(diphenyl) carbonate, phosgene, triphosgene, diphosgene, bromophosgene, and bishaloformate may be used. Preferably, triphosgene or phosgene may be used.

The polycarbonate resin may have a weight average molecular weight of 1,000 to 100,000 g/mol, preferably 5,000 to 50,000 g/mol. More preferably, the weight average molecular weight (g/mol) is 1,000 or more, 5,000 or more, 10,000 or more, 21,000 or more, 22,000 or more, 23,000 or more, 24,000 or more, 25,000 or more, 26,000 or more, 27,000 or more, or 28,000 or more. In addition, the weight average molecular weight is 100,000 or less, 50,000 or less, 34,000 or less, 33,000 or less, or 32,000 or less.

In addition, it may be preferred in view of stable expression of physical properties of the composition that the polycarbonate resin has a melt index (MI) of 5 g/10 min to 25 g/10 min or a melt index of 5 g/10 min to 15 g/10 min according to ASTM D1238 (measured at 300° C. and a load of 1.2 kg for 10 minutes).

The above-described polycarbonate resin may be synthesized directly according to a well-known synthesis method of a general aromatic polycarbonate resin, or may be commercially available aromatic polycarbonate.

Further, a content of the polycarbonate resin may vary depending on the physical properties of the composition to be controlled. For example, the polycarbonate resin may have a content of 20 to 70 wt %, or 30 to 68 wt %, based on the total content of the resin composition of an exemplary embodiment of the present invention. Such a polycarbonate resin is a component included as a base resin together with the copolycarbonate resin to be described below, wherein when the content thereof is excessively increased, a content of the copolycarbonate resin is relatively decreased, and thus, the impact resistance (impact strength), etc., of the resin composition may not be sufficient. Further, when the content of the polycarbonate resin is excessively decreased, mechanical properties such as rigidity, etc., may not be sufficient.

(2) Copolycarbonate Resin

The copolycarbonate resin is a component that is capable of improving physical properties, particularly, impact strength, etc., of the above-described polycarbonate resin, and may be included as a base resin in the resin composition of an exemplary embodiment, together with the polycarbonate resin. The copolycarbonate resin includes an aromatic polycarbonate-based first repeating unit, and an aromatic polycarbonate-based second repeating unit having one or more siloxane bonds.

That is, the copolycarbonate resin may be distinguished from the above-described polycarbonate resin (for example, a polycarbonate resin only having an aromatic polycarbonate main chain without introduction of a polysiloxane structure) in that the polysiloxane structure is introduced into a main chain of the polycarbonate.

[First Repeating Unit]

Specifically, the aromatic polycarbonate-based first repeating unit is formed by a reaction of a diol compound and a carbonate precursor, and may include a repeating unit represented by Chemical Formula 1 as described above.

As non-limiting example, when bisphenol A, i.e., the aromatic diol compound, and triphosgene, i.e., the carbonate precursor, are polymerized, the repeating unit represented by Chemical Formula 1 may be represented by Chemical Formula 1-1 below:

[Chemical Formula 1-1]

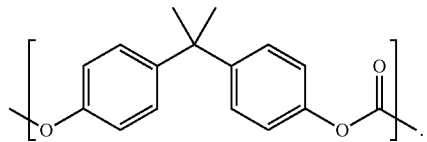

As the carbonate precursor, at least one selected from the group consisting of dimethyl carbonate, diethyl carbonate, dibutyl carbonate, dicyclohexyl carbonate, diphenyl carbonate, ditolyl carbonate, bis(chlorophenyl)carbonate, di-m-cresyl carbonate, dinaphthyl carbonate, bis(diphenyl) carbonate, phosgene, triphosgene, diphosgene, bromophosgene, and bishaloformate may be used. Preferably, triphosgene or phosgene may be used.

[Second Repeating Unit]

Meanwhile, the polycarbonate-based second repeating unit having one or more siloxane bonds is formed by a reaction of one or more siloxane compounds and a carbonate precursor. In a specific example, the polycarbonate-based second repeating unit having one or more siloxane bonds may include at least one repeating unit selected from the group consisting of Chemical Formula 3 below, and more preferably, may further include at least one repeating unit selected from the group consisting of Chemical Formula 2 below:

[Chemical Formula 1]

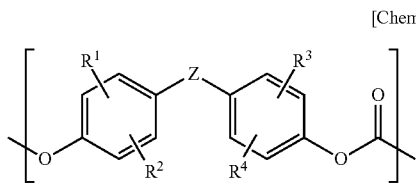

in Chemical Formula 1, $R^1$ to $R^4$ are each independently hydrogen, $C_{1-10}$ alkyl, $C_{1-10}$ alkoxy, or halogen, and Z is $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO.

Here, $R^1$ to $R^4$ and Z may have the same or different structure from a group corresponding to the above-described repeating unit including the polycarbonate resin.

[Chemical Formula 2]

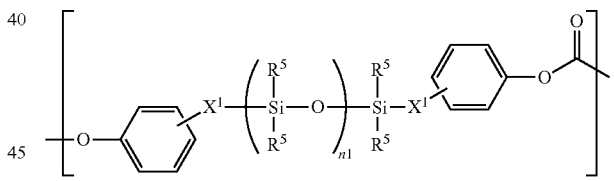

in Chemical Formula 2, $X^1$ is each independently $C_{1-10}$ alkylene, $R^5$ is each independently hydrogen; $C_{1-15}$ alkyl unsubstituted or substituted with oxiranyl, oxiranyl-substituted $C_{1-10}$ alkoxy, or $C_{6-20}$ aryl; halogen; $C_{1-10}$ alkoxy; allyl; $C_{1-10}$ haloalkyl; or $C_{6-20}$ aryl, and n1 is an integer of 10 to 200.

[Chemical Formula 3]

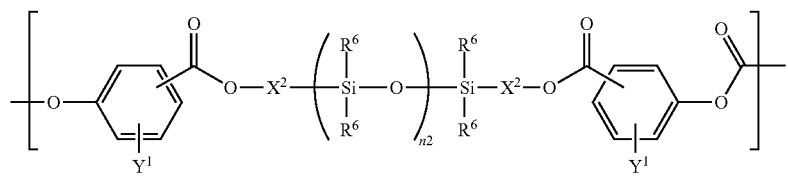

in Chemical Formula 3, $X^2$ is each independently $C_{1-10}$ alkylene, $Y^1$ is each independently hydrogen, $C_{1-6}$ alkyl, halogen, hydroxy, $C_{1-6}$ alkoxy or $C_{6-20}$ aryl, $R^6$ is each independently hydrogen; $C_{1-15}$ alkyl unsubstituted or substituted with oxiranyl, oxiranyl-substituted $C_{1-10}$ alkoxy, or $C_{6-20}$ aryl; halogen; $C_{1-10}$ alkoxy; allyl; $C_{1-10}$ haloalkyl; or $C_{6-20}$ aryl, and n2 is an integer of 10 to 200. In Chemical Formula 2, $X^1$ may be each independently $C_{2-10}$ alkylene, preferably, $C_{2-4}$ alkylene, and more preferably, propane-1,3-diyl. In Chemical Formula 2, $R^5$ may be each independently hydrogen, methyl, ethyl, propyl, 3-phenylpropyl, 2-phenylpropyl, 3-(oxiranylmethoxy)propyl, fluoro, chloro, bromo, iodo, methoxy, ethoxy, propoxy, allyl, 2,2,2-trifluoroethyl, 3,3,3-trifluoropropyl, phenyl or naphthyl. In addition, preferably, $R^5$ may be each independently $C_{1-10}$ alkyl, more preferably, $C_{1-6}$ alkyl, and more preferably, $C_{1-3}$ alkyl, and the most preferably, methyl. In Chemical Formula 2, n1 is an integer of 10 to 200, preferably, may be i) an integer of 30 to 60, ii) an integer of 20 or more, 25 or more, or 30 or more, 40 or less, or 35 or less, or iii) an integer of 50 or more, or 55 or more, 70 or less, 65 or less, or 60 or less. For example, the repeating unit represented by Chemical Formula 2 may be represented by Chemical Formula 2-1 below:

[Chemical Formula 2-1]

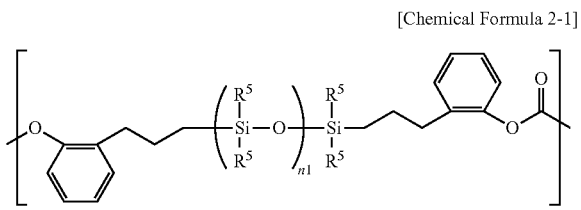

in Chemical Formula 2-1, $R^5$ and n1 are each the same as defined in Chemical Formula 2 above.

Further, in Chemical Formula 3, preferably, $X^2$ may be each independently $C_{2-10}$ alkylene, more preferably, $C_{2-6}$ alkylene, and the most preferably, isobutylene.

Preferably, in Chemical Formula 3, $Y^1$ may be hydrogen. In Chemical Formula 3, $R^6$ may be each independently hydrogen, methyl, ethyl, propyl, 3-phenylpropyl, 2-phenylpropyl, 3-(oxiranylmethoxy)propyl, fluoro, chloro, bromo, iodo, methoxy, ethoxy, propoxy, allyl, 2,2,2-trifluoroethyl, 3,3,3-trifluoropropyl, phenyl or naphthyl. In addition, preferably, $R_6$ may be each independently $C_{1-10}$ alkyl, more preferably, $C_{1-6}$ alkyl, and more preferably, $C_{1-3}$ alkyl, and the most preferably, methyl.

In Chemical Formula 3, n2 is an integer of 10 to 200, preferably, may be i) an integer of 30 to 60, ii) an integer of 20 or more, 25 or more, or 30 or more, 40 or less, or 35 or less, or iii) an integer of 50 or more, or 55 or more, 70 or less, 65 or less, or 60 or less.

For example, the repeating unit represented by Chemical Formula 3 may be represented by Chemical Formula 3-1 below:

[Chemical Formula 3-1]

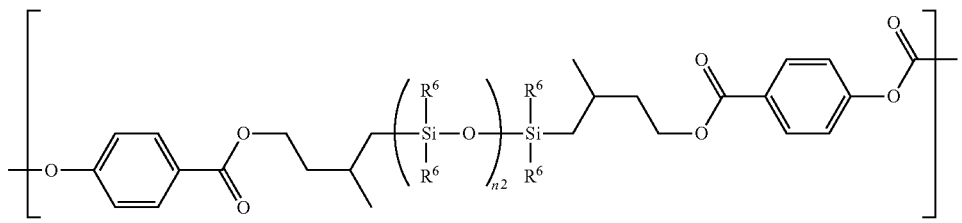

in Chemical Formula 3-1,

R6 and n2 are each the same as defined in Chemical Formula 3 above.

According to an exemplary embodiment of the present invention, the copolycarbonate resin may include at least one repeating unit selected from the group consisting of Chemical Formula 3 above, and more suitably, may further include at least one repeating unit selected from the group consisting of Chemical Formula 2 above. In addition, the copolycarbonate resin may include at least two respective repeating units represented by Chemical Formula 2 and/or 3.

It may be confirmed that when the repeating units represented by Chemical Formulas 2 and 3 are included together or at least two respective repeating units are included together, degrees of improvement in room temperature impact strength, low temperature impact strength, and fluidity may be remarkably increased, which is because the degree of improvement in physical properties acts complementarily by the respective repeating units.

The description 'at least two repeating units' used herein means to include at least two repeating units each having a different structure within scopes of the respective Chemical Formulas, or at least two repeating units each having the same structure but having the different number of repeating units (n1 or n2) of silicon oxide in the structures of Chemical Formulas 2 and 3.

For example, the description 'at least two repeating units' used herein means to include i) one repeating unit represented by Chemical Formula 2 and another repeating unit represented by Chemical Formula 2, or ii) one repeating unit represented by Chemical Formula 3 and another repeating unit represented by Chemical Formula 3.

In each case including the two repeating units, a weight ratio of the two repeating units may be 1:99 to 99:1. Preferably, the weight ratio of the at least two repeating units may be 3:97 to 97:3, 5:95 to 95:5, 10:90 to 90:10, or 15:85 to 85:15, and more preferably, 20:80 to 80:20.

The repeating unit represented by Chemical Formula 2 and the repeating unit represented by Chemical Formula 3 may be derived from a siloxane compound represented by Chemical Formula 2-2 below and a siloxane compound represented by Chemical Formula 3-2 below, respectively:

[Chemical Formula 2-2]

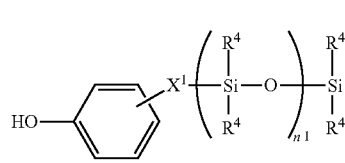

in Chemical Formula 2-2, $X^1$, $R^5$ and n1 are each the same as defined in Chemical Formula 2 above; and

[Chemical Formula 3-2]

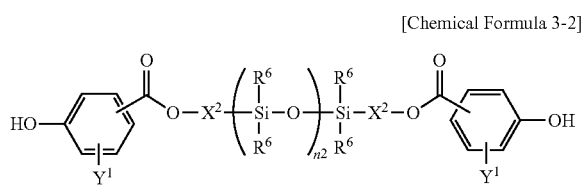

in Chemical Formula 3, $X^2$, $Y^1$, $R^6$ and n2 are each the same as defined in Chemical Formula 3 above. The description 'derived from a siloxane compound' means that a hydroxy group of each of the siloxane compounds and a carbonate precursor are reacted to form the repeating unit represented by Chemical Formula 2 and the repeating unit represented by the Chemical Formula 3, respectively. Further, descriptions of the carbonate precursors that may be used for the formation of the repeating units represented by Chemical Formulas 2 and 3 are the same as those described for the carbonate precursor that may be used for the formation of the repeating unit represented by Chemical Formula 1 described above.

In addition, the compound represented by Chemical Formula 2-2 and the compound represented by Chemical Formula 3-2 may be prepared by Reaction Schemes 1 and 2, respectively.

[Reaction Scheme 1]

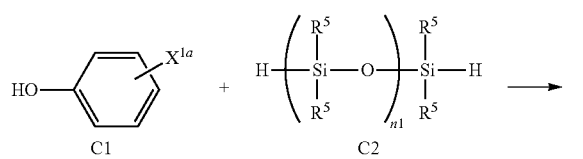

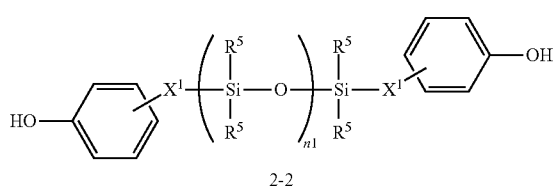

in Reaction Scheme 1, $X^{1a}$ is $C_{2-10}$ alkenyl, $X^1$, $R^5$ and n1 are each the same as defined in Chemical Formula 2 above; and

[Reaction Scheme 2]

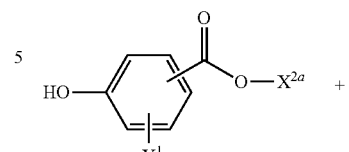

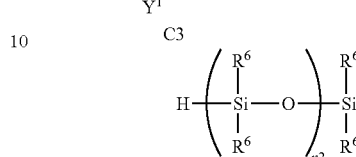

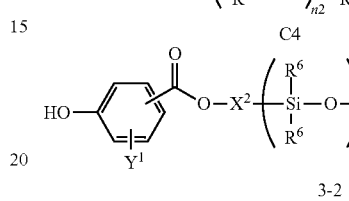

in Reaction Scheme 2, $X^{2a}$ is $C_{2-10}$ alkenyl, and $X^2$, $Y^1$, $R^6$ and n2 are each the same as defined in Chemical Formula 3 above.

In Reaction Scheme 1 and Reaction Scheme 2, the reactions may be preferably conducted in the presence of a metal catalyst. As the metal catalyst, a platinum (Pt) catalyst may be preferably used. The Pt catalyst may include at least one selected from the group consisting of Ashby catalyst, Karstedt catalyst, Lamoreaux catalyst, Speier catalyst, $PtCl_2$ (COD), $PtCl2(benzonitrile)_2$, and $H_2PtBr_6$. The metal catalyst may have a content of 0.001 parts by weight or more, 0.005 parts by weight or more, or 0.01 parts by weight or more, and 1 part by weight or less, 0.1 parts by weight or less, or 0.05 parts by weight or less, based on 100 parts by weight of the compound represented by Chemical Formula C1 or C3.

Further, the reaction temperature is preferably 80° C. to 100° C. In addition, the reaction time is preferably 1 to 5 hours.

In addition, in Reaction Schemes 1 and 2, the compound represented by Chemical Formula C2 or C4 may be prepared by a reaction of organodisiloxane and organocyclosiloxane in the presence of an acid catalyst, and n1 and n2 may be controlled by controlling contents of the reaction materials. The reaction temperature is preferably 50° C. to 70° C. In addition, the reaction time is preferably 1 to 6 hours.

As the organodisiloxane, at least one selected from the group consisting of tetramethyldisiloxane, tetraphenyldisiloxane, hexamethyldisiloxane and hexaphenyldisiloxane may be used. Further, the organocyclosiloxane may be, for example, organocyclotetrasiloxane. Examples of the organocyclotetrasiloxane may include octamethylcyclotetrasiloxane and octaphenylcyclotetrasiloxane, etc.

The organodisiloxane may have a content of 0.1 parts by weight or more, or 2 parts by weight or more, and 10 parts by weight or less, 8 parts by weight or less, based on 100 parts by weight of the organocyclosiloxane.

As the acid catalyst, at least one selected from the group consisting of $H_2SO_4$, $HClO_4$, $AlCl_3$, $SbCl_5$, $SnCl_4$, and acidic white clay may be used. In addition, the acid catalyst may have a content of 0.1 parts by weight or more, 0.5 parts by weight or more, 1 part by weight or more, and 10 parts by weight or less, 5 parts by weight or less, or 3 parts by weight or less, based on 100 parts by weight of the organocyclosiloxane.

Physical properties of the copolycarbonate resin may be improved by controlling the contents of the repeating units represented by Chemical Formulas 2 and 3. Here, the weight ratio of the repeating units corresponds to a weight ratio of the siloxane compounds used for polymerization of the copolycarbonate, for example, the siloxane compounds represented by Chemical Formulas 2-2 and 3-2 above.

[Composition and Preparation Method of Copolycarbonate Resin]

In the copolycarbonate resin, the aromatic polycarbonate-based first repeating unit and the aromatic polycarbonate-based second repeating unit having one or more siloxane bonds may have a molar ratio of 1:0.0001 to 1:0.01, or 1:0.0005 to 1:0.008, or 1:0.001 to 1:0.006, and a weight ratio of 1:0.001 to 1:1, or 1:0.005 to 1:0.1, or 1:0.01 to 1:0.03.

In addition, the copolycarbonate resin may include 90 wt % to 99.999 wt % of the first repeating unit and 0.001 wt % to 10 wt % of the second repeating unit. That is, when the content of the second repeating unit is excessively decreased, it may be difficult to sufficiently implement improvement in physical properties such as room temperature impact strength, low temperature impact strength, and fluidity according to the second repeating unit. Meanwhile, when the content of the second repeating unit is excessively increased, flowability and molding processability may be decreased while excessively increasing the molecular weight of the copolycarbonate resin.

In addition, the copolycarbonate resin may have a weight average molecular weight of 1,000 to 100,000 g/mol, preferably 5,000 to 50,000 g/mol. A suitable ductility and YI of the copolycarbonate resin may be ensured within the weight average molecular weight range. More preferably, the weight average molecular weight (g/mol) is 1,000 or more, 5,000 or more, 10,000 or more, 21,000 or more, 22,000 or more, 23,000 or more, 24,000 or more, 25,000 or more, 26,000 or more, 27,000 or more, or 28,000 or more. In addition, the weight average molecular weight is 100,000 or less, 50,000 or less, 34,000 or less, 33,000 or less, or 32,000 or less.

Further, a content of the copolycarbonate resin may vary depending on physical properties of the composition to be controlled. For example, the copolycarbonate resin may have a content of 10 to 70 wt %, or 20 to 50 wt %, based on the total content of the resin composition of an exemplary embodiment of the present invention.

That is, the copolycarbonate resin preferably has a content of 10 wt % or more based on the total resin composition to exhibit the above-described effect of improving physical properties such as impact resistance, etc., thereby providing a molded article, etc., exhibiting appropriate physical properties even if the glass fiber and the impact-reinforcing agent are used in a low content. However, when the copolycarbonate resin is added in an excess content, the transparency of the resin composition may be deteriorated, and the effect of improving heat resistance and impact strength may reach a threshold value or may be rather deteriorated. In this respect, the copolycarbonate resin may have a content of 70 wt % or less.

Meanwhile, the above-described copolycarbonate resin may be prepared by using the above-described aromatic diol compound, the carbonate precursor, and one or more siloxane compounds.

At the time of polymerization of these compounds, the one or more siloxane compounds may have a content of 0.1 wt % or more, 0.5 wt % or more, 1 wt % or more, 1.5 wt % or more, and 20 wt % or less, 10 wt % or less, 7 wt % or less, 5 wt % or less, 4 wt % or less, 3 wt % or less, or 2 wt % or less, based on the total content (100 wt %) of the aromatic diol compound, the carbonate precursor, and the one or more siloxane compounds. Further, the aromatic diol compound may have a content of 40 wt % or more, 50 wt % or more, or 55 wt % or more, and 80 wt % or less, 70 wt % or less, or 65 wt % or less, based on the total content (100 wt %) of the aromatic diol compound, the carbonate precursor, and the one or more siloxane compounds. In addition, the carbonate precursor may have a content of 10 wt % or more, 20 wt % or more, or 30 wt %, and 60 wt % or less, 50 wt % or less, or 40 wt % or less, based on the total content (100 wt %) of the aromatic diol compound, the carbonate precursor, and the one or more siloxane compounds.

In addition, as the polymerization method, an interfacial polymerization method may be used as one example. In this case, the polymerization reaction may be performed at a low temperature under an atmospheric pressure, and may easily control a molecular weight. The interfacial polymerization may be preferably conducted in the presence of an acid binder and an organic solvent. Furthermore, the interfacial polymerization may include, for example, steps of conducting pre-polymerization, then adding a coupling agent and conducting polymerization again. In this case, a copolycarbonate having a high molecular weight may be obtained.

The materials used in the interfacial polymerization are not particularly limited as long as they may be used in polymerization of polycarbonates.

The used content thereof may be controlled as required.

The acid binder may include, for example, alkali metal hydroxides such as sodium hydroxide, potassium hydroxide, etc., or amine compounds such as pyridine, etc.

The organic solvent is not particularly limited as long as it is a solvent that is usually used in the polymerization of polycarbonates. As one example, halogenated hydrocarbons such as methylene chloride, chlorobenzene, etc., may be used.

Further, during the interfacial polymerization, a reaction accelerator, for example, a tertiary amine compound such as triethylamine, tetra-n-butylammonium bromide, tetra-n-butylphosphonium bromide, or the like, a quaternary ammonium compound, a quaternary phosphonium compound, or the like, may be further used for accelerating the reaction.

In the interfacial polymerization, the reaction temperature may be preferably 0 to 40° C. and the reaction time may be preferably 10 minutes to 5 hours. Further, during the interfacial polymerization reaction, pH may be preferably maintained at 9 or more, or 11 or more.

In addition, the interfacial polymerization may be performed by further including a molecular weight modifier. The molecular weight modifier may be added before the initiation of polymerization, during the initiation of polymerization, or after the initiation of polymerization.

As the molecular weight modifier, mono-alkyl phenol may be used. As one example, the mono-alkyl phenol is at least one selected from the group consisting of p-tert-butyl phenol, p-cumyl phenol, decyl phenol, dodecyl phenol, tetradecyl phenol, hexadecyl phenol, octadecyl phenol, eicosyl phenol, docosyl phenol and triacontyl phenol. Preferably, the mono-alkyl phenol may be p-tert-butylphenol, and in this case, the effect of controlling the molecular weight is great.

The molecular weight modifier may have a content of 0.01 parts by weight or more, 0.1 parts by weight or more, or 1 part by weight or more, and 10 parts by weight or less, 6 parts by weight or less, or 5 parts by weight or less, based on 100 parts by weight of the aromatic diol compound. Within the range as described above, a desired molecular weight may be obtained.

(3) Glass Fiber

Meanwhile, the resin composition of an exemplary embodiment includes a glass fiber to improve rigidity, warpage characteristic, or the like, of the molded article. However, as described above, when the glass fiber, in particular, a glass fiber which is surface-treated with a silane compound, or the like, is used in a high content, problems such as protrusion of glass fiber, etc., may occur, and thus, the appearance surface characteristic may be poor, and the impact strength of the resin composition and the molded article may be deteriorated. However, the resin composition of an exemplary embodiment may include the above-described copolycarbonate resin to improve the impact strength, etc., of the resin composition, and may include the glass fiber in a relatively reduced content.

In addition, as a result of experiments conducted by the present inventors, it was confirmed that when a low content of a glass fiber which is surface-coated (treated) with an epoxy silane compound, a urethane silane compound, an olefin silane compound, or the like, is used as the glass fiber, or a low content of a glass fiber which is not surface-coated (treated) with these compounds is used as the glass fiber, the warpage characteristic of the resin composition and the molded article could be improved, and more preferably, the above properties could be more appropriately improved by using the glass fiber which is not surface-coated (treated). Accordingly, it was confirmed that the resin composition of an exemplary embodiment could exhibit excellent appearance surface characteristic by including the glass fiber in a relatively low content and could exhibit excellent impact strength, and improve warpage characteristic by including the copolycarbonate resin.

As the glass fiber, all of surface-untreated glass fibers previously known to be usable for improvement of physical properties of the polycarbonate-based resin composition, etc., may be used without any particular limitation. For example, a cocoon or flat glass fiber may be used.

More specifically, the glass fiber may have a rectangular, circular or elliptical cross section in a direction perpendicular to a longitudinal direction, and may have an aspect ratio according to Equation 1 below of 100 to 500 or 100 to 300. In addition, the glass fiber may have a length (L) of 2 to 7 mm, and a length of the long side or a length of a (long) diameter (D) of 5 to 20 μm, or 10 to 15 μm:

Aspect ratio (δ)=$L/D$ [Equation 1]

in Equation 1, L is a length of the glass fiber, D is a length of the longest side of the rectangular cross section, a length of a diameter of the circular cross section, or a length of the longest diameter of the elliptical cross section.

By using such a glass fiber, rigidity and toughness of the resin composition according to an exemplary embodiment may be suitably improved, and warpage characteristic may be suitably improved. This is because the glass fiber having the above-described structural characteristic may control a suitable binding force between the resin and the glass fiber, thereby appropriately absorbing external impact through a space of the resin and the glass fiber.

When the glass fiber is out of structural requirements to have an excessively decreased aspect ratio, it is not preferred since the resin composition and the molded article of an exemplary embodiment may be brittle, and when the glass fiber has an excessively increased aspect ratio, a possibility of surface protrusion of the glass fiber may be high, and thus, surface characteristics such as surface smoothness, and a product appearance, etc., may be deteriorated, and toughness and impact strength, etc., of the molded article may be deteriorated.

The glass fiber may have a content of 1 to 20 wt %, or 3 to 15 wt %, or 5 to 10 wt %, based on the total content of the resin composition of an exemplary embodiment. When the content of the glass fiber is excessively increased, surface smoothness or appearance characteristic, etc., of the molded article may be deteriorated due to protrusion of the glass fiber, etc. However, when the content of the glass fiber is excessively decreased, the strength or the warpage characteristic of the resin composition and the molded article of an exemplary embodiment may not be sufficiently improved.

(4) Impact-Reinforcing Agent

The resin composition of an exemplary embodiment further includes an impact-reinforcing agent in addition to the above-described respective components. The impact-reinforcing agent may include a rubber-modified vinyl-based graft copolymer to appropriately reinforce the impact strength of the resin composition and the molded article thereof in an exemplary embodiment. However, the resin composition of an exemplary embodiment may exhibit excellent impact strength, etc., while including a low content of the impact-reinforcing agent due to the use of the above-described copolycarbonate resin, and may exhibit excellent flame retardancy together due to the application of the low-content of the impact-reinforcing agent and a phosphorus-based flame retardant described later.

The rubber-modified vinyl-based graft copolymer may be a graft copolymer having a core-shell structure in which a vinyl-based unsaturated monomer is grafted to a core structure to form a shell, the core structure including at least one rubber selected from the group consisting of diene-based rubber, acrylate-based rubber and silicone-based rubber, and it was confirmed that the impact-reinforcing agent may be used in the resin composition of an exemplary embodiment to more appropriately reinforce the impact strength, etc., even under a low content.

In the impact-reinforcing agent in a form of the graft copolymer, the rubber may be at least one of C4-C6 diene-based rubber, acrylate-based rubber, silicone-based rubber, etc., and more suitably, silicone-based rubber, acrylate-based rubber or silicone-acrylate-based rubber in view of structural stability of the impact-reinforcing agent.

In a more specific example, the acrylate-based rubber may be rubber formed from (meth)acrylate monomers such as methyl(meth)acrylate, ethyl(meth)acrylate, n-propyl(meth)acrylate, n-butyl(meth)acrylate, 2-ethylhexyl(meth)acrylate, hexyl(meth)acrylate, etc., and a curing agent such as ethyleneglycol di(meth)acrylate, propyleneglycol di(meth)acrylate, 1,3-butyleneglycol di(meth)acrylate, 1,4-butyleneglycol di(meth)acrylate, allyl(meth)acrylate, triallyl cyanurate, or the like, may be further used to form the rubber.

In addition, the silicone-based rubber may be used by being prepared from cyclosiloxane, and specific examples thereof may include silicone-based rubbers prepared from at least one selected from the group consisting of hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, and octaphenylcyclotetrasiloxane. In order to form the silicone rubber, a curing agent such as trimethoxymethylsilane, triethoxyphenylsilane, tetramethoxysilane, tetraethoxysilane, or the like, may be further used.

In addition, in the above-described impact-reinforcing agent, the vinyl-based unsaturated monomer grafted to the rubber may be at least one of an aromatic vinyl-based monomer, a monomer copolymerizable with the aromatic vinyl-based monomer, etc.

The aromatic vinyl monomer may include styrene, α-methylstyrene, β-methylstyrene, p-methylstyrene, para-t-butylstyrene, ethylstyrene, etc. These monomers may be used alone or in combination of at least two. In addition, the monomer copolymerizable with the aromatic vinyl monomer may include a vinyl cyanide compound, C1-C12 alkyl (meth)acrylate, (meth)acrylate, C1-C12 alkyl or phenyl nucleus-substituted maleimide, etc.

These monomers may be used alone or in combination of at least two. The above-described impact-reinforcing agent in a form of the rubber-modified vinyl-based graft copolymer may be synthesized directly according to methods well-known to those skilled in the art, or may be commercially available.

In addition, the above-described impact-reinforcing agent may have a content of 1 to 10 wt %, or 1.5 to 5 wt %, or 2 to 4 wt %, based on the total content of the resin composition of an exemplary embodiment. When the content of the impact-reinforcing agent is excessively increased, an additional effect of improving the impact strength may not be substantially exhibited, and it may be difficult for the resin composition of an exemplary embodiment to exhibit excellent flame retardancy. On the contrary, when the content of the impact-reinforcing agent is excessively decreased, the impact resistance of the resin composition and the molded article of an exemplary embodiment, such as impact strength, etc., may not be sufficient.

(5) Phosphorus-Based Flame Retardant

The resin composition of an exemplary embodiment further includes a phosphorus-based flame retardant. The phosphorus-based flame retardant that is usable is not particularly limited in view of a kind, and any phosphorus-based flame retardant known to be usable in a resin composition from the past, for example, at least one organic phosphorus-based flame retardant selected from the group consisting of a monophosphate compound, a phosphate oligomer compound, a phosphonate oligomer compound, a phosphonitrile oligomer compound, and a phosphonic acid amide compound may be used without particular limitation.

The resin composition and the molded article of an exemplary embodiment include a relatively low content of the impact-reinforcing agent, and, include a predetermined level or more of content of the phosphorus-based flame retardant instead of the reduced content of the impact-reinforcing agent, thereby exhibiting more excellent flame retardancy.

More specific examples of the phosphorus-based flame retardant may include a condensed phosphoric acid ester represented by Chemical Formula 5 below:

[Chemical Formula 5]

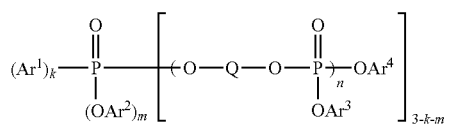

in Chemical Formula 5, $Ar^1$, $Ar^2$, $Ar^3$ and $Ar^4$ are each independently halogen-free aromatic group, Q is

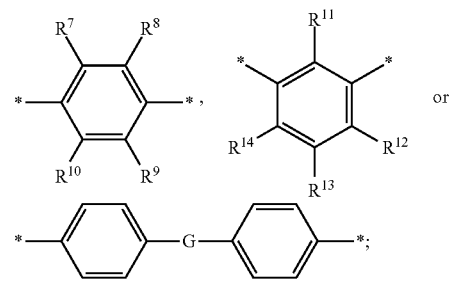

$R^7$ to $R^{14}$ are each independently a hydrogen atom or a $C_{1-5}$ alkyl group; G is a direct binding, O, S, $SO_2$, $C(CH_3)_2$, $CH_2$, and CHPh, and Ph is phenyl group, n is an integer of 1 or more, and k and m are each an integer of 0 to 2, and (k+m) is an integer of 0 to 2.

The phosphoric acid ester-based flame retardant is able to express high flame retardancy of V-0 grade or V-1 grade according to UL 94 V test while having unique physical properties of the polycarbonate resin and minimizing the deterioration of the effect of improving physical properties by the addition of the copolycarbonate resin.

The condensed phosphoric acid ester represented by Chemical Formula 5 may include a mixture of condensed phosphoric acid esters in which n is different from each other or a structure is different from each other.

In Chemical Formula 5, n is an integer of 1 or more, and the upper limit thereof is preferably 40 or less in view of expression of flame retardancy; and preferably, may be 1 to 10, and more preferably 1 to 5.

In Chemical Formula 5, k and m are each an integer of 0 to 2, and (k+m) is an integer of 0 to 2; and preferably, k and m may be an integer of 0 to 1, respectively, and more preferably 1, respectively.

In Q of Chemical Formula 5, $R^7$ to $R^{14}$ are each independently a hydrogen atom or a $C_{1-5}$ an alkyl group; and specifically, may be hydrogen, methyl, ethyl, n-propyl, isopropyl, n-butyl, sec-butyl, tert-butyl, neopentyl, etc., and preferably, hydrogen, methyl or ethyl; and more preferably, hydrogen. $Ar^1$, $Ar^2$, $Ar^3$ and $Ar^4$ in Chemical Formula 5 are each independently a halogen-free aromatic group, and specifically, may be an aromatic group having a benzene skeleton, a naphthalene skeleton, an indene skeleton, or an anthracene skeleton.

In addition, $Ar^1$, $Ar^2$, $Ar^3$ and $Ar^4$ may be substituted with a C1-C8 organic moiety without containing halogen, respectively. For example, $Ar^1$, $Ar^2$, $Ar^3$ and $Ar^4$ may be each independently phenyl, tolyl, cresyl, xylyl, isopropylphenyl, butylphenyl, tert-butylphenyl, di-tert-butylphenyl, p-cumylphenyl, etc.

In a more specific example, the condensed phosphoric acid ester represented by Chemical Formula 5 may be a compound represented by Chemical Formulas 5-1 to 5-4 below:

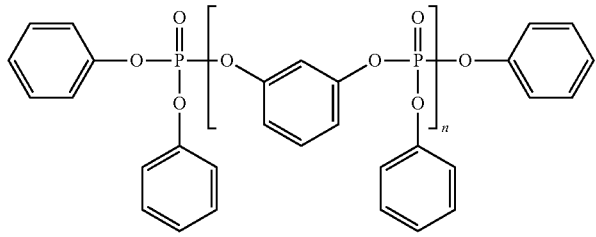

[Chemical Formula 5-1]

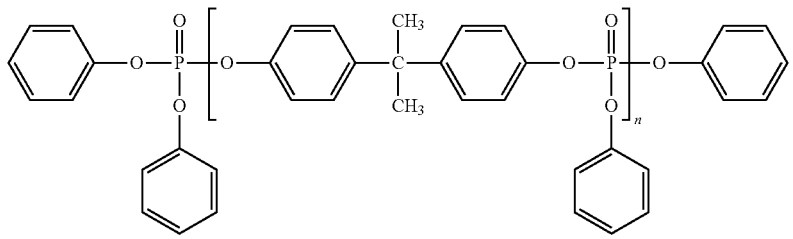

[Chemical Formula 5-2]

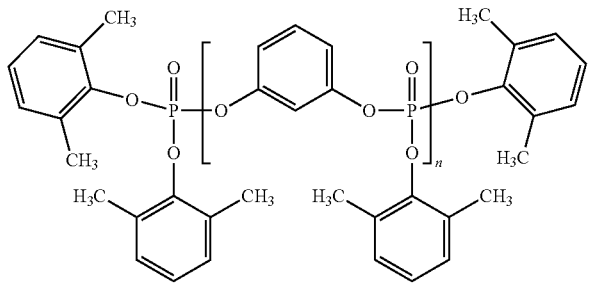

[Chemical Formula 5-3]

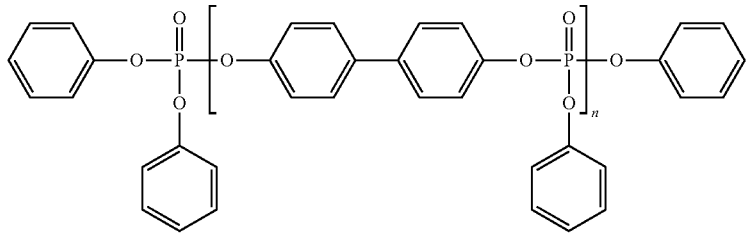

[Chemical Formula 5-4]

in Chemical Formulas 5-1 to 5-4, n is an integer of 1 or more.

As non-limiting example, the commercially available phosphoric acid ester-based flame retardant may include PX-200, PX-201, PX-202, CR-733S, CR-741, CR747 (all prepared by DAIHACHI CHEMICAL INDUSTRY Co., Ltd.); FP-600, FP-700, FP-800 (all prepared by ADEKA Co.), etc.

Meanwhile, the phosphorus-based flame retardant may have a content of 2 to 15 wt %, or 4 to 13 wt %, or 5 to 10 wt %, based on the total content of the resin composition of an exemplary embodiment. Accordingly, the resin composition of an exemplary embodiment may exhibit excellent flame retardancy, and minimize reduction of mechanical properties of the molded article, etc., caused by the addition of the flame retardant.

(6) Other Component

Meanwhile, the resin composition according to an exemplary embodiment may further include additives, for example, a drip inhibitor of a fluoropolymer such as polytetrafluoroethylene (PTFE), etc.; a surfactant; a nucleating agent; a coupling agent; a filler; a plasticizer; a lubricant; an anti-microbial agent; a release agent; a heat stabilizer; an anti-oxidant; a UV stabilizer; a compatibilizer; a coloring agent; an antistatic agent; pigment; dye; a flame resistant, etc., if necessary.

The content of the additive may vary depending on physical properties to be exhibited in the composition. For example, the additives may have a content of 0.01 to 10 parts by weight, based on 100 parts by weight of the polycarbonate resin, respectively.

However, it is preferred that the total content of the additive is suitably 20 parts by weight or less, or 15 parts by weight or less, or 10 parts by weight or less based on 100 parts by weight of the polycarbonate resin, in order to prevent the heat resistance, the impact strength and the chemical resistance, etc., of the polycarbonate-based resin composition from being deteriorated by the application of the additive.

II. Polycarbonate-Based Resin Molded Article

According to another exemplary embodiment of the present invention, there is provided a molded article including the above-described polycarbonate-based resin composition.

The molded article is an article obtained by molding the above-described polycarbonate-based resin composition as raw materials through a method such as extrusion, injection-molding, casting, etc.

A molding method and conditions thereof may be appropriately selected and controlled according to kinds of the molded article.

As a non-limiting example, the molded article may be obtained by mixing and extrusion molding the polycarbonate resin-based composition to prepare pellets, and then, drying and injecting the pellet.

In particular, since the molded article is formed from the polycarbonate-based resin composition, low deformation characteristic, excellent impact strength, excellent appearance surface characteristic, and excellent flame retardancy, etc., may be exhibited, and the molded article may be suitably used as a material for housing of portable electronic devices such as a tablet PC, etc.

[Advantageous Effects]

The polycarbonate-based resin composition according to the present invention and the molded article thereof may exhibit low deformation characteristic, excellent impact strength, excellent appearance surface characteristic, and excellent flame retardancy, etc., and may be suitably used as a material for housing of portable electronic devices such as a tablet PC, etc.

EXAMPLES

Hereinafter, preferable Examples of the present invention will be provided for better understanding of the present invention. However, the following Examples are provided only for illustration of the present invention, and should not be construed as limiting the present invention by the examples.

Preparation Example 1

Preparation of polyorganosiloxane (AP-PDMS, n1=34)

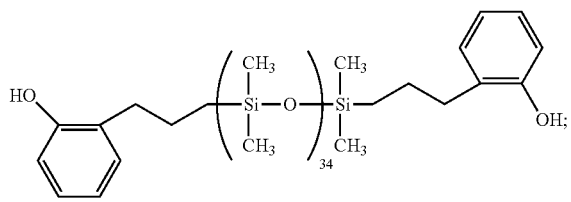

After 47.6 g (160 mmol) of octamethylcyclotetrasiloxane and 2.4 g (17.8 mmol) of tetramethyldisiloxane were mixed with each other, the mixture was placed in a 3 L flask with 1 part by weight of acid clay (DC-A3) based on 100 parts by weight of octamethylcyclotetrasiloxane, and reacted at 60° C. for 4 hours. After the reaction was terminated, the reaction product was diluted with ethylacetate and quickly filtered using a celite. The repeating unit (n1) of the unmodified polyorganosiloxane obtained as described above was 34 when confirmed through $^1$H NMR.

4.81 g (35.9 mmol) of 2-allylphenol and 0.01 g (50 ppm) of Karstedt's platinum catalyst were added to the obtained terminal-unmodified polyorganosiloxane and reacted at 90° C. for 3 hours. After the reaction was terminated, the unreacted polyorganosiloxane was removed by evaporation under condition of 120° C. and 1 torr. The terminal-modified polyorganosiloxane obtained as described above was designated as AP-PDMS (n1=34). AP-PDMS was pale yellow oil, the repeating unit (n1) was 34 when confirmed through $^1$H NMR using Varian 500 MHz, and further purification was not required.

Preparation Example 2

Preparation of polyorganosiloxane (MBHB-PDMS, n2=58)

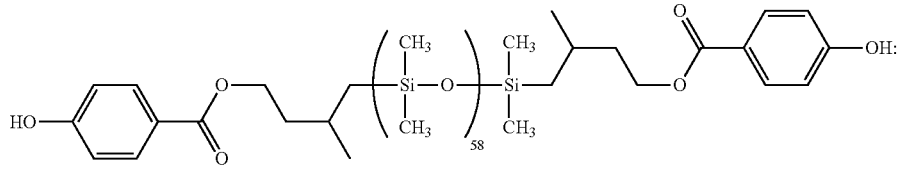

After 47.60 g (160 mmol) of octamethylcyclotetrasiloxane and 1.5 g (11 mmol) of tetramethyldisiloxane were mixed with each other, the mixture was placed in a 3 L flask with 1 part by weight of acid clay (DC-A3) based on 100 parts by weight of octamethylcyclotetrasiloxane, and reacted at 60° C. for 4 hours. After the reaction was terminated, the reaction product was diluted with ethylacetate and quickly filtered using a celite. The repeating unit (n2) of the terminal-unmodified polyorganosiloxane obtained as described above was 58 when confirmed through $^1$H NMR.

6.13 g (29.7 mmol) of 3-methylbut-3-enyl 4-hydroxybenzoate and 0.01 g (50 ppm) of Karstedt's platinum catalyst were added to the obtained terminal-unmodified polyorganosiloxane and reacted at 90° C. for 3 hours. After the reaction was terminated, the unreacted polyorganosiloxane was removed by evaporation under condition of 120° C. and 1 torr. The terminal-modified polyorganosiloxane obtained as described above was designated as MBHB-PDMS (n2=58). MBHB-PDMS was pale yellow oil, the repeating unit (n2) was 58 when confirmed through $^1$H NMR using Varian 500 MHz, and further purification was not required.

Preparation Example 3

Preparation of copolycarbonate resin: 1784 g of water, 385 g of NaOH and 232 g of bisphenol A (BPA) were added to a polymerization reactor, and dissolved with mixing under $N_2$ atmosphere. To the above-prepared mixture, 4.3 g of para-tert butylphenol (PTBP) and a mixed solution of 4.72 g of AP-PDMS (n1=34) prepared by Preparation Example 1 and 0.52 g of MBHB-PDMS (n2=58) prepared by Preparation Example 2 dissolved in methylene chloride (MC) were added. Subsequently, 128 g of triphosgene (TPG) was dissolved in MC and the dissolved TPG solution was added to the mixture and reacted for 1 hour while maintaining pH at 11 or more. After 10 minutes, 46 g of triethylamine (TEA) was added thereto to perform a coupling reaction. After a total reaction time of 1 hour and 20 minutes, TEA was removed by lowering the pH to 4, and then the produced polymer was washed three times with distilled water so that pH was adjusted to neutral pH of 6 to 7. The obtained polymer was re-precipitated in a mixed solution of methanol and hexane, and dried at 120° C. to finally obtain a copolycarbonate resin (Mw=30,500).

Example and Comparative Example

Respective components were added according to composition shown in Table 1 below, followed by melting and kneading-extrusion, thereby preparing pellets. The prepared pellets were dried at 70° C. for 6 hours, followed by injection-molding, to manufacture samples for evaluating physical properties.

The components used in respective Examples and Comparative Examples are as follows.

(A) Bisphenol A Polycarbonate Resin (PC)

The polycarbonate resin is a polymer of bisphenol A, and a melt index (MI) thereof was measured as a weight (g) measured for 10 minutes at a temperature of 300° C. and a load of 1.2 kg according to ASTM D1238. As a result of the measurement, an aromatic polycarbonate resin having a melt index of 10 g/10 min (PC1300-10 manufactured by LG Chem.) was used.

(B) Copolycarbonate Resin (PC 8000-05 manufactured by LG Chem.) according to Preparation Example 3

(C) Glass Fiber

A chopped strand G/F 415A (for high impact polycarbonate and polyethylene) having a diameter (D) of 14 μm, a length (L) of 5 mm and an aspect ratio (δ) calculated by Equation 1 of about 357 and manufactured by Owens Corning was used.

(D) Metablen S-2100 Using a Silicone-Acrylate Rubber Manufactured by MRC of Japan was Used as the Impact-Reinforcing Agent of the Rubber-Modified Vinyl-Based Graft Aopolymer.

(E) Phosphorus-Based Flame Retardant

FP-600, a liquid flame retardant which is bisphenol-A bis(diphenylphosphate), was used.

(F) Drip Inhibitor

Polytetrafluoroethylene (PTFE) was used (Xflon-G manufactured by POCERA Co.).

TABLE 1

|   | Example 1 (wt %) | Example 2 (wt %) | Example 3 (wt %) | Example 4 (wt %) | Comparative Example 1 (wt %) | Comparative Example 2 (wt %) |
|---|---|---|---|---|---|---|
| A | 66.3 | 36.3 | 62.3 | 67.3 | 86.3 | 83.3 |
| B | 20 | 50 | 20 | 20 | 0 | 0 |
| C | 5 | 5 | 5 | 5 | 5 | 5 |
| D | 2 | 2 | 2 | 1 | 2 | 5 |
| E | 6 | 6 | 10 | 6 | 6 | 6 |
| F | 0.7 | 0.7 | 0.7 | 0.7 | 0.7 | 0.7 |

Experimental Example

Physical properties of each sample formed from each composition of Examples and Comparative Examples were measured by the following methods, and results thereof were shown in Table 2 below.

(1) Melt index (MI): calculated as a weight (g) measured at a temperature of 300° C. and a load of 1.2 kg for 10 minutes according to ASTM D1238.

(2) Impact strength (IZOD): measured at a temperature of 23° C. with ⅛ inch (Notched Izod, J/m) according to ASTM D256.

(3) Flame Retardant Rating: measured according to UL 94 V Test (vertical burning test, 1.6 mm) standard.

TABLE 2

|   | Example 1 | Example 2 | Example 3 | Example 4 | Comparative Example 1 | Comparative Example 2 |
|---|---|---|---|---|---|---|
| Melt Index (g/10 min) | 10 | 7 | 13 | 11 | 12 | 12 |
| Impact Strength (kgcm/cm) | 25 | 35 | 20 | 21 | 18 | 26 |
| Flame Retardant Rating | V-1 | V-1 | V-0 | V-1 | V-1 | V-2 |

Referring to Table 2 above, it was confirmed that Examples exhibited excellent flame retardancy or impact strength as compared to Comparative Examples, together with the excellent melt index.

The invention claimed is:

1. A polycarbonate-based resin composition comprising:
   a polycarbonate resin including an aromatic polycarbonate-based first repeating unit,
   a copolycarbonate resin including an aromatic polycarbonate-based first repeating unit, and an aromatic polycarbonate-based second repeating unit having one or more siloxane bonds,
   a glass fiber,
   an impact-reinforcing agent including a rubber-modified vinyl-based graft copolymer, and
   a phosphorus-based flame retardant;
   wherein the first repeating unit each independently includes a repeating unit represented by Chemical Formula 1 below,
   the second repeating unit includes at least one repeating unit selected from the group consisting of Chemical Formula 3 below, and;
   the glass fiber has a rectangular, circular or elliptical cross section in a direction perpendicular to a longitudinal direction, and has an aspect ratio according to Equation 1 below of 100 to 500, a length (L) of 2 to 7 mm, and D of 5 to 20 μm:

$$\text{Aspect ratio } (\delta) = L/D \qquad \text{[Equation 1]}$$

in Equation 1, L is a length of the glass fiber, D is a length of the longest side of the rectangular cross section, a length of a diameter of the circular cross section, or a length of the longest diameter of the elliptical cross section,

[Chemical Formula 1]

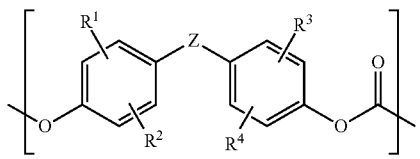

in Chemical Formula 1,
R¹ to R⁴ are each independently hydrogen, $C_{1-10}$ alkyl, $C_{1-10}$ alkoxy, or halogen, and
Z is $C_{1-10}$ alkylene unsubstituted or substituted with phenyl, $C_{3-15}$ cycloalkylene unsubstituted or substituted with $C_{1-10}$ alkyl, O, S, SO, $SO_2$, or CO;

[Chemical Formula 3]

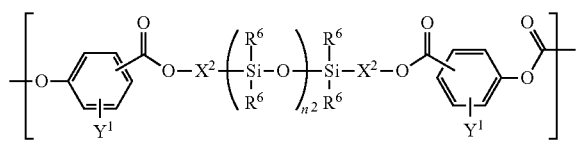

in Chemical Formula 3,
$X^2$ is each independently $C_{1-10}$ alkylene,
$Y^1$ is each independently hydrogen, $C_{1-6}$ alkyl, halogen, hydroxy, $C_{1-6}$ alkoxy or $C_{6-20}$ aryl,
$R^6$ is each independently hydrogen; $C_{1-15}$ alkyl unsubstituted or substituted with oxiranyl, oxiranyl-substituted $C_{1-10}$ alkoxy, or $C_{6-20}$ aryl; halogen; $C_{1-10}$ alkoxy; allyl; $C_{1-10}$ haloalkyl; or $C_{6-20}$ aryl, and
n2 is an integer of 10 to 200.

2. The polycarbonate-based resin composition of claim 1, wherein:
the polycarbonate resin has a melt index (MI) of 5 g/10 min to 25 g/10 min at a temperature of 300° C. and a load of 1.2 kg.

3. The polycarbonate-based resin composition of claim 1, wherein:
the second repeating unit further includes at least one repeating unit selected from the group consisting of Chemical Formula 2 below:

[Chemical Formula 2]

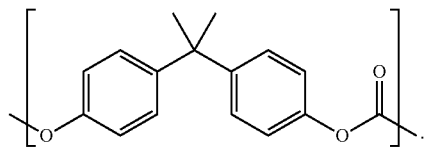

in Chemical Formula 2,
$X^1$ is each independently $C_{1-10}$ alkylene,
$R^5$ is each independently hydrogen; $C_{1-15}$ alkyl unsubstituted or substituted with oxiranyl, oxiranyl-substituted $C_{1-10}$ alkoxy, or $C_{6-20}$ aryl; halogen; $C_{1-10}$ alkoxy; allyl; $C_{1-10}$ haloalkyl; or $C_{6-20}$ aryl, and
n1 is an integer of 10 to 200.

4. The polycarbonate-based resin composition of claim 1, wherein:
the repeating unit represented by Chemical Formula 1 is represented by Chemical Formula 1-1 below:

[Chemical Formula 1-1]

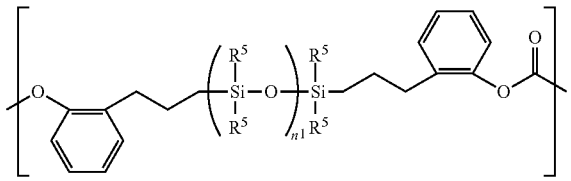

5. The polycarbonate-based resin composition of claim 3, wherein:
the repeating unit represented by Chemical Formula 2 is represented by Chemical Formula 2-1 below:

[Chemical Formula 2-1]

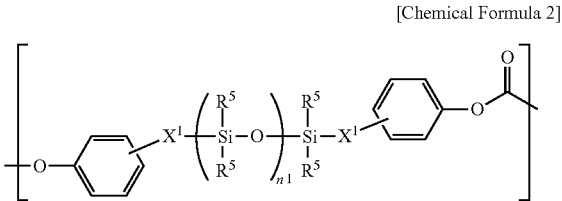

in Chemical Formula 2-1,
$R^5$ and n1 are each the same as defined in Chemical Formula 2 above.

6. The polycarbonate-based resin composition of claim 1, wherein:
the repeating unit represented by Chemical Formula 3 is represented by Chemical Formula 3-1 below:

[Chemical Formula 3-1]

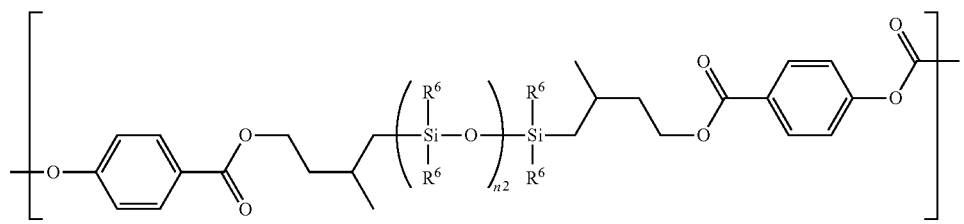

in Chemical Formula 3-1, $R^6$ and n2 are each the same as defined in Chemical Formula 3 above.

7. The polycarbonate-based resin composition of claim 1, wherein:
the copolycarbonate resin includes 90 to 99.999 wt % of the first repeating unit and 0.001 to 10 wt % of the second repeating unit.

8. The polycarbonate-based resin composition of claim 1, wherein:
the polycarbonate resin and the copolycarbonate resin each have a weight average molecular weight of 1,000 to 100,000 g/mol.

9. The polycarbonate-based resin composition of claim 1, wherein:
the glass fiber is a glass fiber surface-treated with an epoxy silane-based compound or an olefin silane-based compound, or a surface-untreated glass fiber.

10. The polycarbonate-based resin composition of claim 1, wherein:
the rubber-modified vinyl-based graft copolymer is a graft copolymer having a core-shell structure in which a vinyl-based unsaturated monomer is grafted to a core structure to form a shell,
the core structure including at least one rubber selected from the group consisting of diene-based rubber, acrylate-based rubber and silicone-based rubber.

11. The polycarbonate-based resin composition of claim 1, wherein:
the phosphorus-based flame retardant includes a condensed phosphoric acid ester represented by Chemical Formula 5 below:

[Chemical Formula 5]

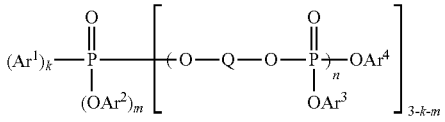

in Chemical Formula 5, $Ar^1$, $Ar^2$, $Ar^3$ and $Ar^4$ are each independently halogen-free aromatic group, Q is

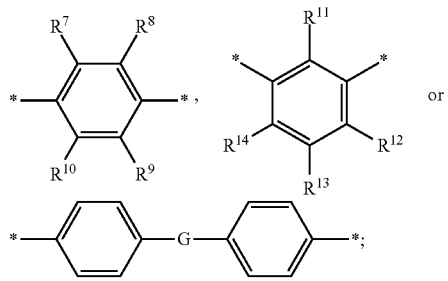

$R^7$ to $R^{14}$ are each independently a hydrogen atom or a $C_{1-5}$ alkyl group; G is a direct binding, O, S, $SO_2$, $C(CH_3)_2$, $CH_2$, and CHPh, and Ph is phenyl group, n is an integer of 1 or more, and k and m are each an integer of 0 to 2, and (k+m) is an integer of 0 to 2.

12. The polycarbonate-based resin composition of claim 1, wherein the polycarbonate-based resin composition includes:
20 to 70 wt % of the polycarbonate resin,
10 to 70 wt % of the copolycarbonate resin,
1 to 20 wt % of the glass fiber,
1 to 10 wt % of the impact-reinforcing agent, and
2 to 15 wt % of the phosphorus-based flame retardant.

13. The polycarbonate-based resin composition of claim 1, wherein:
the polycarbonate-based resin composition further includes a drip inhibitor of a fluoropolymer.

14. A molded article comprising the polycarbonate-based resin composition of claim 1.

* * * * *